US007414734B2

(12) United States Patent
Horie

(10) Patent No.: US 7,414,734 B2
(45) Date of Patent: Aug. 19, 2008

(54) IMAGE POSITION DETECTING DEVICE AND IMAGE FORMING APPARATUS USING THE SAME

(75) Inventor: Yasuyuki Horie, Ibaraki (JP)

(73) Assignee: Ricoh Printing Systems, Ltd., Tokyo (JP)

( * ) Notice: Subject to any disclaimer, the term of this patent is extended or adjusted under 35 U.S.C. 154(b) by 137 days.

(21) Appl. No.: 11/358,130

(22) Filed: Feb. 22, 2006

(65) Prior Publication Data

US 2006/0192980 A1 Aug. 31, 2006

(30) Foreign Application Priority Data

Feb. 25, 2005 (JP) ............................ 2005-051682

(51) Int. Cl.
*G01B 11/14* (2006.01)

(52) U.S. Cl. ........................ 356/614; 356/634; 356/218

(58) Field of Classification Search ......... 356/614–615, 356/634–636, 218; 250/559.22, 559.24, 250/559.26, 559.36; 348/149; 382/124; 399/49

See application file for complete search history.

(56) References Cited

U.S. PATENT DOCUMENTS 6,148,270 A * 11/2000 Nakajima et al. ............. 702/97
6,404,506 B1 * 6/2002 Cheng et al. ................ 356/634
6,737,665 B1 * 5/2004 Kinrot et al. ........... 250/559.36
7,027,139 B2 * 4/2006 Ogihara et al. .............. 356/218

FOREIGN PATENT DOCUMENTS

JP 3068865 9/1992

* cited by examiner

*Primary Examiner*—Sang Nguyen
(74) *Attorney, Agent, or Firm*—Morrison & Foerster LLP

(57) ABSTRACT

An image position detecting device is disclosed that detects an image position based on a reflected light from an image carrier that reflects a light irradiated from a light emitting source. The device includes first and second light receivers that are spaced apart in a moving direction of the image carrier such that the first light receiver detects a toner image adhered on and being moved by the image carrier before the second light receiver detects the toner image, and a comparison output unit that compares first and second analog signals input from the first and second light receivers to determine whether a level of the first analog signal is higher than a level of the second analog signal, and outputs the comparison result as an output signal in binary form. The first and second analog signals are input to the comparison output unit at different levels.

6 Claims, 7 Drawing Sheets

CONVENTIONAL ART

CONVENTIONAL ART

CONVENTIONAL ART

IMAGE POSITION DETECTING DEVICE AND IMAGE FORMING APPARATUS USING THE SAME

BACKGROUND OF THE INVENTION

1. Field of the Invention

The present invention generally relates to an image position detecting device and an image forming apparatus using the same, and particularly relates to an image position detecting device that accurately detects the position of images and an image forming apparatus using the same.

2. Description of the Related Art

There have been know image forming apparatus that sequentially transfer toner images with different colors formed by corresponding image forming units onto intermediate transfer member and then transfer the toner images onto recording paper at the same time. In such image forming apparatus, small velocity errors and velocity fluctuation of photosensitive member or the intermediate transfer member might cause misalignment between different color images (registration errors) that result in color shift. One solution for this problem is to provide an image forming apparatus with a photodetector or the like so as to detect positions of toner images and correct misalignment (see, for example, Japanese Registration Patent No. 3068865).

The following describes the general configuration of a related-art image position detecting device 10 with reference to FIG. 1. FIG. 1 illustrates the general configuration of the image position detecting device 10. The image position detecting device 10 shown in FIG. 1 comprises an image position detecting board 11, an LED (light emitting diode) 12 as a light emitter, which is mounted on the image position detecting board 11, and a light receiving unit 13. Light emitting sources, including the LED 12, may not be mounted on the image position detecting board 11. The light receiving unit 13 includes two light receivers (photodiodes D1 and D2) (FIG. 2) spaced apart by a predetermined distance in a moving direction of an intermediate transfer member 14 as an image carrier.

In the image position detecting device 10, the LED 12 mounted on the image position detecting board 11 irradiates light onto a predetermined position in a predetermined direction. The irradiated light is reflected by the moving intermediate transfer member 14 and a toner image 15 formed on the intermediate transfer member 14. The reflected light is received by the light receiving unit 13.

The following describes an exemplary circuit configuration of the image position detecting device 10 with reference to FIG. 2. FIG. 2 is an exemplary circuit diagram of the image position detecting device 10. More specifically, FIG. 2 is a circuit diagram of the light receiving side of the image position detecting device 10. In FIG. 2, the two light receivers (photodiodes D1 and D2) are shown, which receive the reflected light from the intermediate transfer member 14 and the toner image 15. The photodiode D1 converts the received light into a photoelectric current. Then, a resistor R1 performs I/V conversion to convert the photoelectric current into a voltage. The voltage is amplified by an operational amplifier Z1 so as to be output as a toner image detection signal SIG1 as a first analog signal.

The photodiode D2 is disposed closest to and downstream (rear side) of the photodiode D1 in a moving direction of the intermediate transfer member 14. The photodiode D2 converts the received light into a photoelectric current. Then, a resistor R2 performs I/V conversion to convert the photoelectric current into a voltage. The voltage is amplified by an operational amplifier Z2 so as to be output as a toner image detection signal SIG2 as a second analog signal.

The voltage of the toner image detection signal SIG1 is clamped by a diode D3 and resistors R3 and R4 so as not to fall below a predetermined minimum level. The two toner image detection signals SIG1 and SIG2 are input to a comparator Z3 as a comparison output unit, which compares the signals SIG1 and SIG2 to determine whether the level of the signal SIG1 is higher than the level of the signal SIG2 and outputs the result as a binary image detection output signal SIG3.

FIG. 3 is a timing chart of the toner image detection signals SIG1 and SIG2 and the image detection output signal SIG3. Referring to FIG. 3, as the lights received by the photodiodes D1 and D2 vary depending on the light intensity of the LED 12 and the color of the toner image transferred by the intermediate transfer member 14, the signal levels of the toner image detection signals SIG1 and SIG2 may vary as shown in (A)-(C) of FIG. 3, for example. However, the cross point of the toner image detection signals SIG1 and SIG2 is preferably maintained in a constant position (d) even under different conditions. This is because the toner position is determined by converting the time interval of the cross point timing into a distance.

The following is an example of calculating, with use of mathematical expressions, the cross point of toner image detection signals SIG1 and SIG2 obtained when an ideal toner image is detected by the ideal image position detecting device 10. When $$\frac{Dp\times V1\times Vc+Dp\times V2\times Vc+Dg\times V1\times V2}{V1\times V2}\leqq Dt\leqq 2Dp+Dg, \tag{2}$$

where Dp is the size of the individual photodiodes D1 and D2 in the moving direction of the intermediate transfer member 14, Dg is the distance between the photodiodes D1 and D2 in the moving direction of the intermediate transfer member 14, Dt is the size of the toner image in the moving direction of the intermediate transfer member 14, V1 is the peak level of the toner image detection signal SIG1, V2 is the peak level of the toner image detection signal SIG2, and Vc is a clamping voltage, then the moving distance X from a toner image detection starting point of the photodiode D1 to the cross point in the moving distance of the intermediate transfer member 14 is given by the following expression:

$$X=\frac{V1\times Dt+V2\times Dg}{V1+V2}+Dp. \tag{3}$$

When V1=V2, then Expression (3) can be replaced by the following expression:

$$X=\frac{Dt+Dg}{2}+Dp. \tag{4}$$

That is, as long as Dt satisfies Expression (2), even if the peak levels V1 and V2 vary due to the condition of the image carrier (intermediate transfer member 14), such as vertical movement and torsion of the image carrier, the image position detecting device 10 can reduce the influence of the condition of the image carrier by adjusting amplification factors of the operational amplifiers Z1 and Z2 to satisfy V1=V2.

In the above-described image position detecting device 10, the operational amplifiers Z1 and Z2 have the same amplification factors so as to satisfy V1=V2. Accordingly, as shown in FIG. 4, when a toner image having a size greater than a predetermined size (Dt>2Dp+Dg) is detected, the peaks of the toner image detection signals SIG1 and SIG2 overlap each other (SIG1(max)=SIG2(max) shown in FIG. 2).

Therefore, the comparator Z3 cannot determine whether the level of the toner image detection signal SIG1 is higher than the level of the toner image detection signal SIG2 while the signals SIG1 and SIG2 remain at the same level, so that the image detection output signal SIG3 remains undetermined during that period. Thus, the image position detecting device 10 cannot perform accurate image position detection, color shift detection, or color shift correction. This problem cannot be solved by the method disclosed in Patent 1 that prevents the output in a normal condition from being undetermined by clamping the voltage.

SUMMARY OF THE INVENTION

The present invention may solve at least one problem described above.

The present invention is directed to an image position detecting device that accurately detects the position of images and an image forming apparatus using the same.

According to an aspect of the present invention, there is provided an image position detecting device that detects a position of an image based on a reflected light from an image carrier that reflects a light irradiated from a light emitting source, comprising first and second light receivers that are spaced apart by a predetermined distance in a moving direction of the image carrier such that the first light receiver detects a toner image adhered on and being moved by the image carrier before the second light receiver detects the toner image; and a comparison output unit that compares a first analog signal input from the first light receiver and a second analog signal input from the second light receiver to determine whether the level of the first analog signal is higher than the level of the second analog signal, and outputs the comparison result as an output signal in binary form; wherein the first and second analog signals are input to the comparison output unit at different levels.

Since the first and second analog signals are input to the comparison output unit at different levels, the output signal is prevented from being undetermined. Therefore, the position of the toner image on the image carrier can be accurately detected.

The above-described image position detecting device preferably further comprises a first amplifier that amplifies the first analog signal and a second amplifier that amplifies the second analog signal, the first and second amplifiers having different amplification factors so as to produce a level difference between the first and second analog signals.

When the first and second amplifiers have different amplification factors so as to produce the level difference between the first and second analog signals as described above, the image position detecting device can reduce the influence of the condition of the image carrier. Accordingly, the position of the toner image on the image carrier can be accurately detected.

It is preferable for the above-described image position detecting device that the level difference between a peak level of the first analog signal and a peak level of the second analog signal be set such that noise is absorbed.

When the level difference is set such that noise is absorbed, false detection of the signal due to the noise, such as electromagnetically induced disturbance noise, can be prevented. Accordingly, the position of the toner image on the image carrier can be accurately detected.

It is also preferable for the above-described image position detecting device that the comparison output unit make the output signal invalid when the pulse width of the output signal is greater than a predetermined value.

False detection can be prevented by making the output signal when the pulse width of the output signal is greater than a predetermined value. Therefore, the position of the toner image on the image carrier can be accurately detected.

It is also preferable for the above-described image position detecting device that the pulse width Pw be represented by the following expression:

$$Pw(\max) = \frac{1}{Vt}\left\{\left[1 - \frac{Vc}{V2} + \frac{V2}{V1}\right] \times Dp + Dg - \alpha\right\}, \tag{1}$$

where Dp is a size of each of the first light receiver and the second light receiver in the moving direction of the image carrier, Dg is a distance between first light receiver and the second light receiver in the moving direction of the image carrier, V1 is the peak level of the first analog signal, V2 is the peak level of the second analog signal, Vc is a clamping voltage that defines the minimum level of the second analog signal, and Vt is the moving speed of the image carrier.

The image position detecting device can thus calculate the correct pulse width.

According to another aspect of the present invention, there is provided an image forming apparatus comprising the above-described image position detecting device.

This image forming apparatus can accurately detect the position of the toner image on the image carrier. Therefore, highly accurate images can be formed by performing detection and correction of color shift.

DETAILED DESCRIPTION OF THE PREFERRED EMBODIMENT

The following description provides exemplary embodiments of an image position detecting device and an image forming apparatus using the same with reference to the accompanying drawings.

Figure 1:
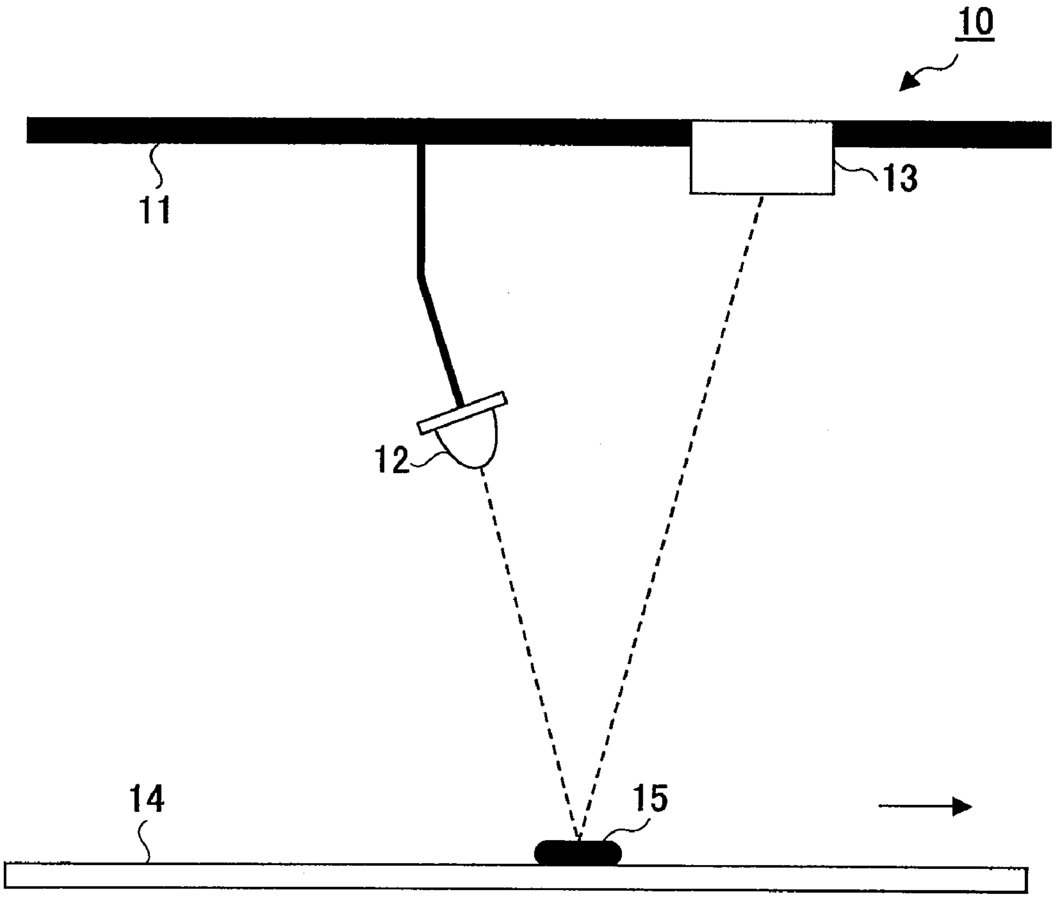
FIG. 1 illustrates the general configuration of an image position detecting device.
Figure 2:
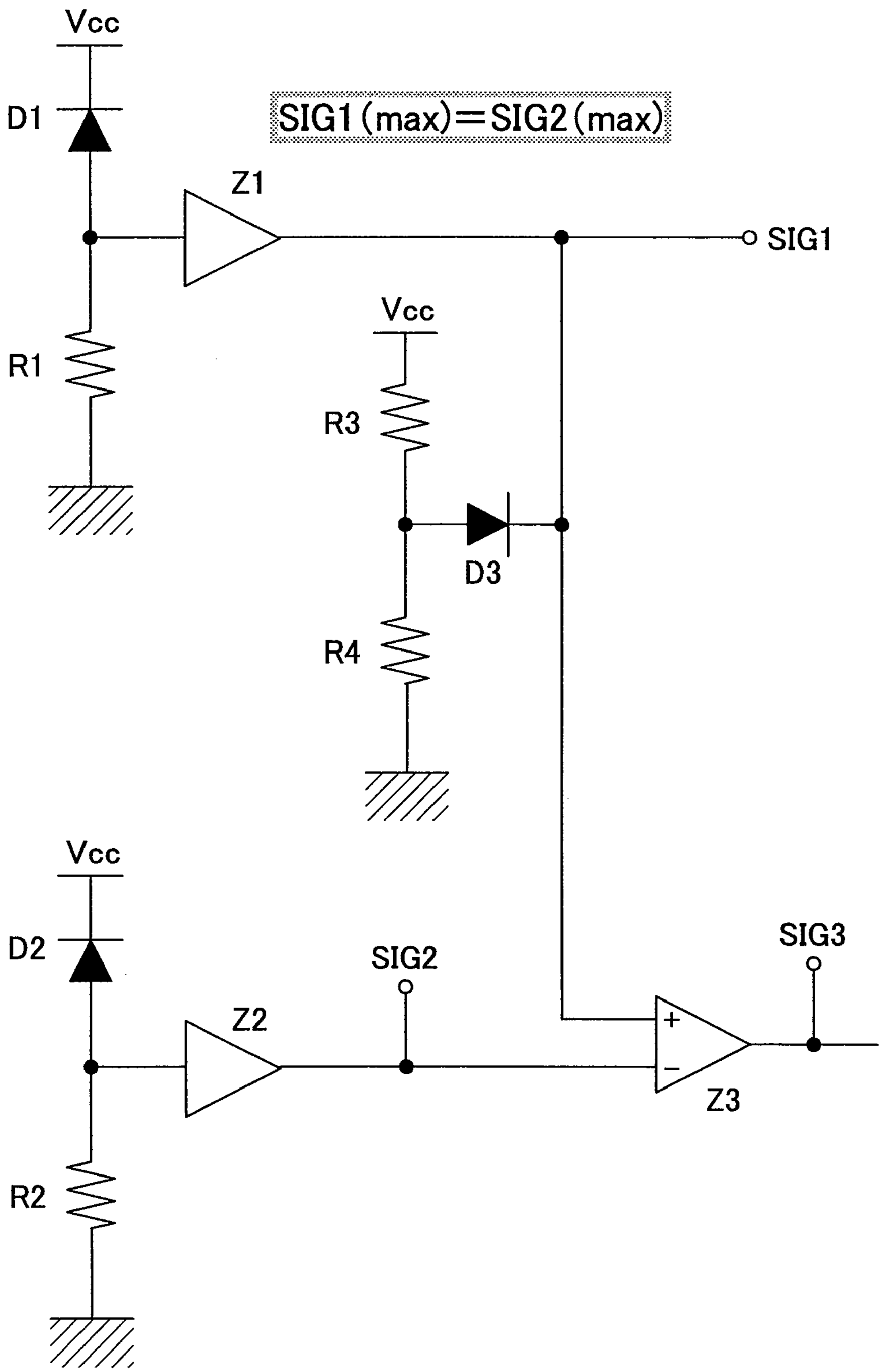
FIG. 2 is an exemplary circuit diagram of an image position detecting device.
Figure 3:
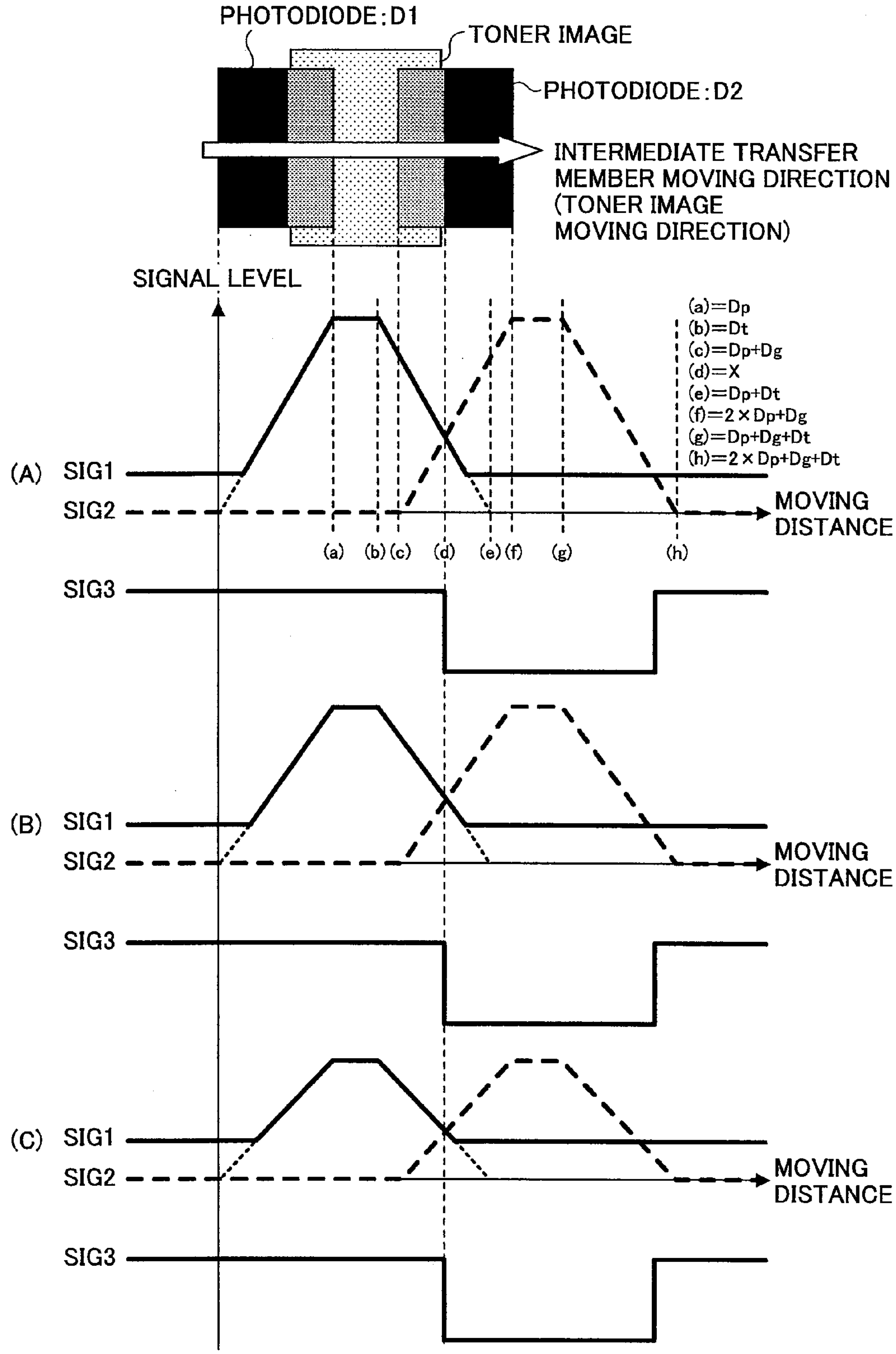
FIG.3 CONVENTIONAL ART
FIG. 3 is a timing chart of signals.
Figure 4:
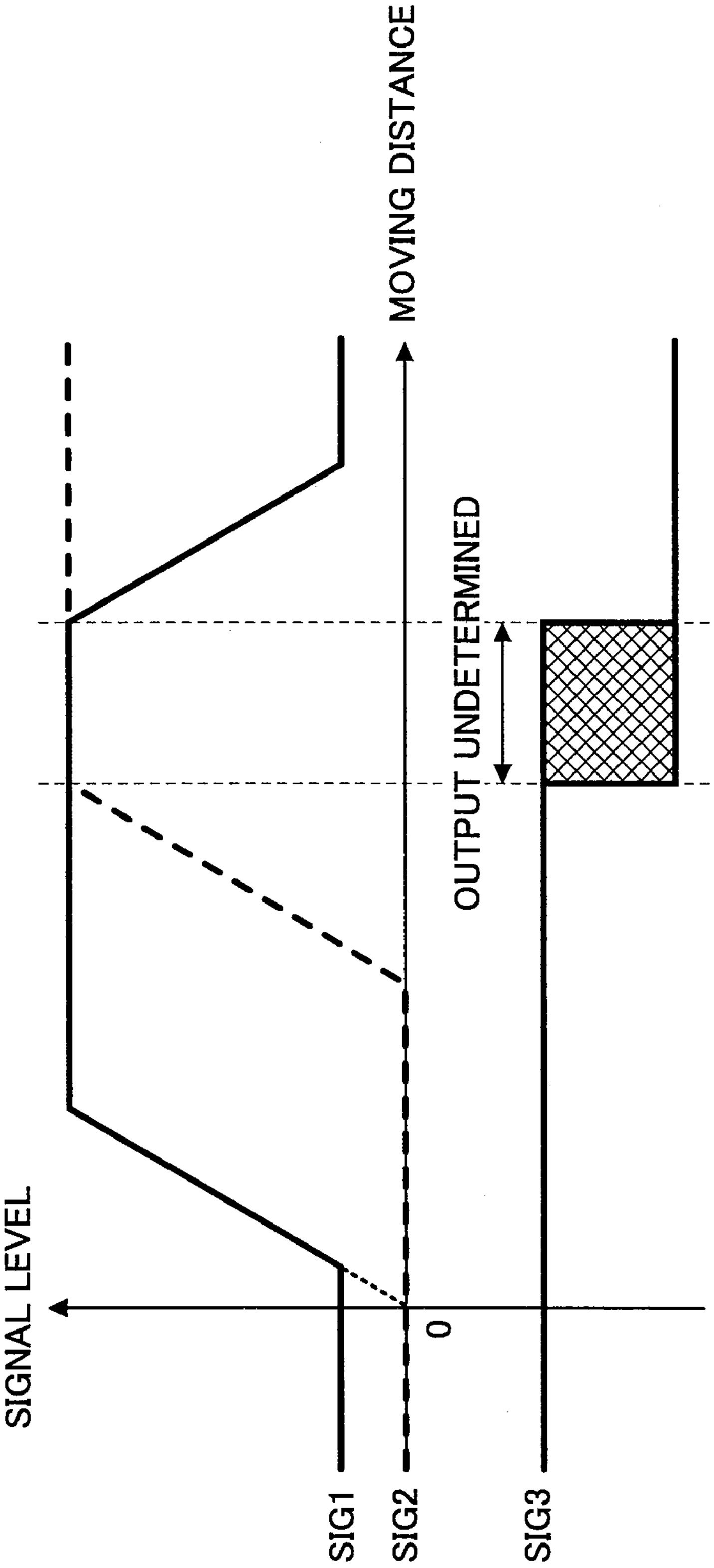
FIG. 4 is a timing chart of signals illustrating a problem with a related-art image position detecting device.
Figure 5:
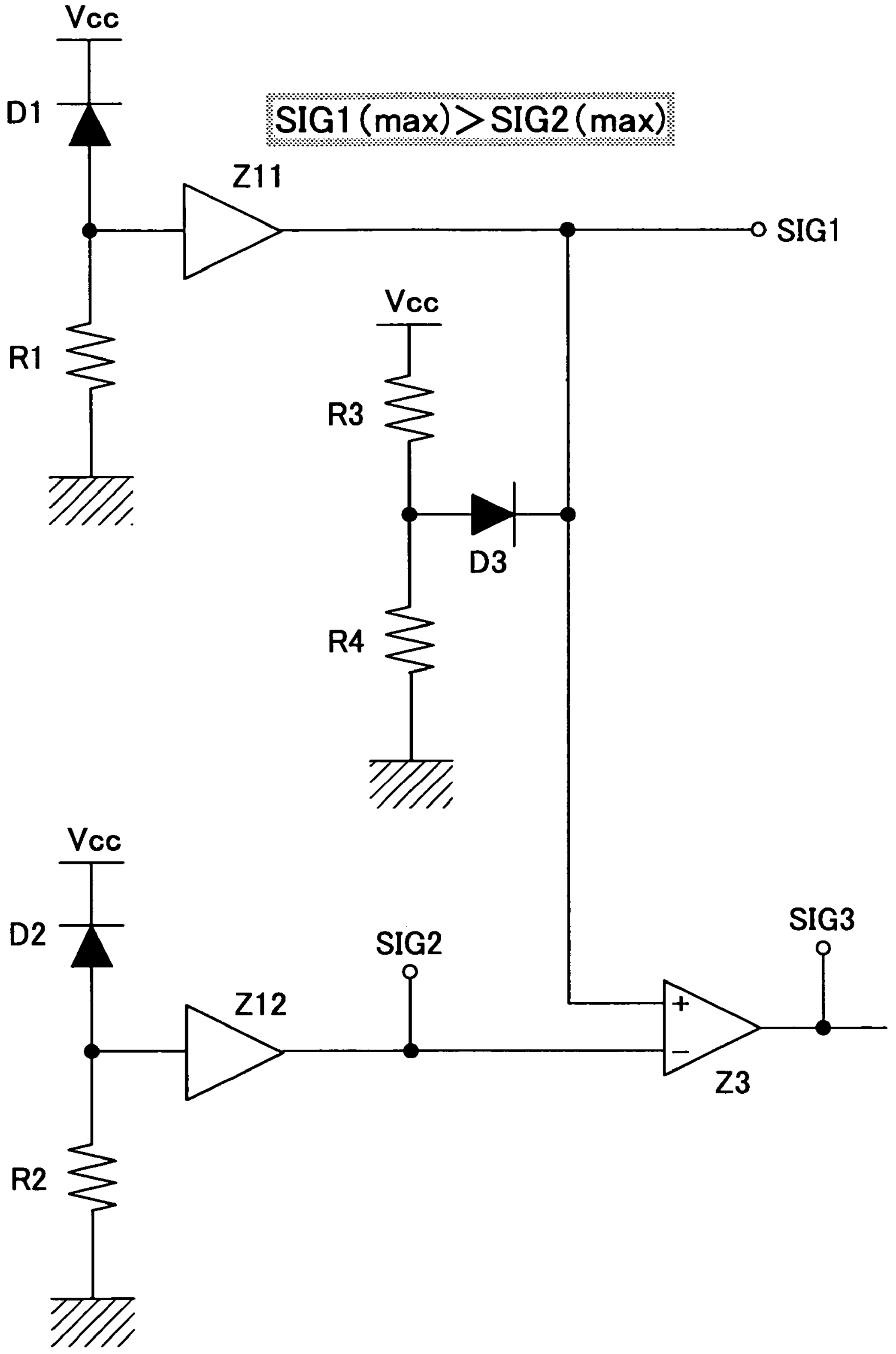
FIG. 5 is an exemplary circuit diagram of an image position detecting device according to an embodiment of the present invention.

FIG. 5 is an exemplary circuit diagram of an image position detecting device 28 (FIG. 7) according to an embodiment of the present invention. More specifically, FIG. 5 is a circuit diagram of the light receiving side of the image position detecting device 28. As the general configuration of the image position detecting device 28 of this embodiment is the same as the general configuration of the image position detecting device 10 of FIG. 1, elements identical or similar to those in FIG. 1 are identified by the same reference numbers. Referring to FIG. 5, the image position detecting device 28 comprises two light receivers (photodiodes D1 and D2) that receive the light reflected from, e.g., the intermediate transfer member 14 as an image carrier, and e.g., the toner image 15. More specifically, the photodiodes D1 and D2 are spaced apart by a predetermined distance in the moving direction of the intermediate transfer member 14, and receive the reflected light from the intermediate transfer member 14 and the toner image 15 adhered to the intermediate transfer member 14.

The photodiode D1 converts the received light into a photoelectric current. Then, a resistor R1 performs I/V conversion to convert the photoelectric current into a voltage. The voltage is amplified by an operational amplifier Z11 so as to be output as a toner image detection signal SIG1 as a first analog signal.

The photodiode D2 is disposed close to and downstream (rear side) of the photodiode D1 in the moving direction of the intermediate transfer member 14. The photodiode D2 converts the received light into a photoelectric current. Then, a resistor R2 performs I/V conversion to convert the photoelectric current into a voltage. The voltage is amplified by an operational amplifier Z12 so as to be output as a toner image detection signal SIG2 as a second analog signal.

The voltage of the toner image detection signal SIG1 is clamped by a diode D3 and resistors R3 and R4 so as not to fall below a predetermined minimum level, thereby maintaining a reference point at a predetermined potential. The two toner image detection signals SIG1 and SIG2 are input to a comparator Z3 as a comparison output unit, which compares the signals SIG1 and SIG2 to determine whether the level of the signal SIG1 is higher than the level of the signal SIG2 and outputs the result as a binary image detection output signal SIG3.

In this embodiment, the operational amplifiers Z11 and Z12 have different amplification factors so as to satisfy SIG1(max)>SIG2(max). More specifically, the operational amplifier Z12 has a smaller amplification factor than the operational amplifier Z11.

That is, the level of the signal obtained from the light receiver (photodiode D1) that detects the toner image first is higher than the level of the signal obtained from the light receiver (photodiode D2) that detects later.

The following is an example of calculating, with use of mathematical expressions, the cross point of the toner image detection signals SIG1 and SIG2 obtained when an ideal toner image is detected by the ideal image position detecting device 28. When Dt satisfies the above Expression (2), where Dp is the size of each of the photodiodes D1 and D2 in the moving direction of the intermediate transfer member 14, Dg is the distance between the photodiodes D1 and D2 in the moving direction of the intermediate transfer member 14, Dt is the size of the toner image in the moving direction of the intermediate transfer member 14, V1 is the peak level of the toner image detection signal SIG1, V2 is the peak level of the toner image detection signal SIG2, and Vc is a clamping voltage, then the distance X from a toner image detection starting point of the photodiode D1 to the cross point in the moving distance of the intermediate transfer member 14 is given by the above Expression (3).

In this embodiment, as the amplification factors applied to the toner image detection signals SIG1 and SIG2 are different, the relationship between V1 and V2 is represented by V2=A×V1 where A (A<1) is the ratio of the amplification factor of the operational amplifier Z12 to the amplification factor of the operational amplifier Z11. Then, Expression (2) can be replaced by the following expression:

$$X = \frac{Dt + A \times Dg}{1 + A} + Dp, \tag{5}$$

where Dt is in a range represented by the following expression:

$$\frac{Dp \times V1 \times Vc + Dp \times V2 \times Vc + Dg \times V1 \times V2}{V1 \times V2} \leqq Dt \leqq (1 + A)\,Dp + Dg. \tag{6}$$

As long as Dt is in the range represented by the above Expression (6) and the amplification factors of the operational amplifiers Z1 and Z2 are fixed to specific values, the image position detecting device 28 is less affected by the condition of the image carrier even if the peak levels V1 and V2 vary due to the condition of the intermediate transfer member 14.

Figure 6:
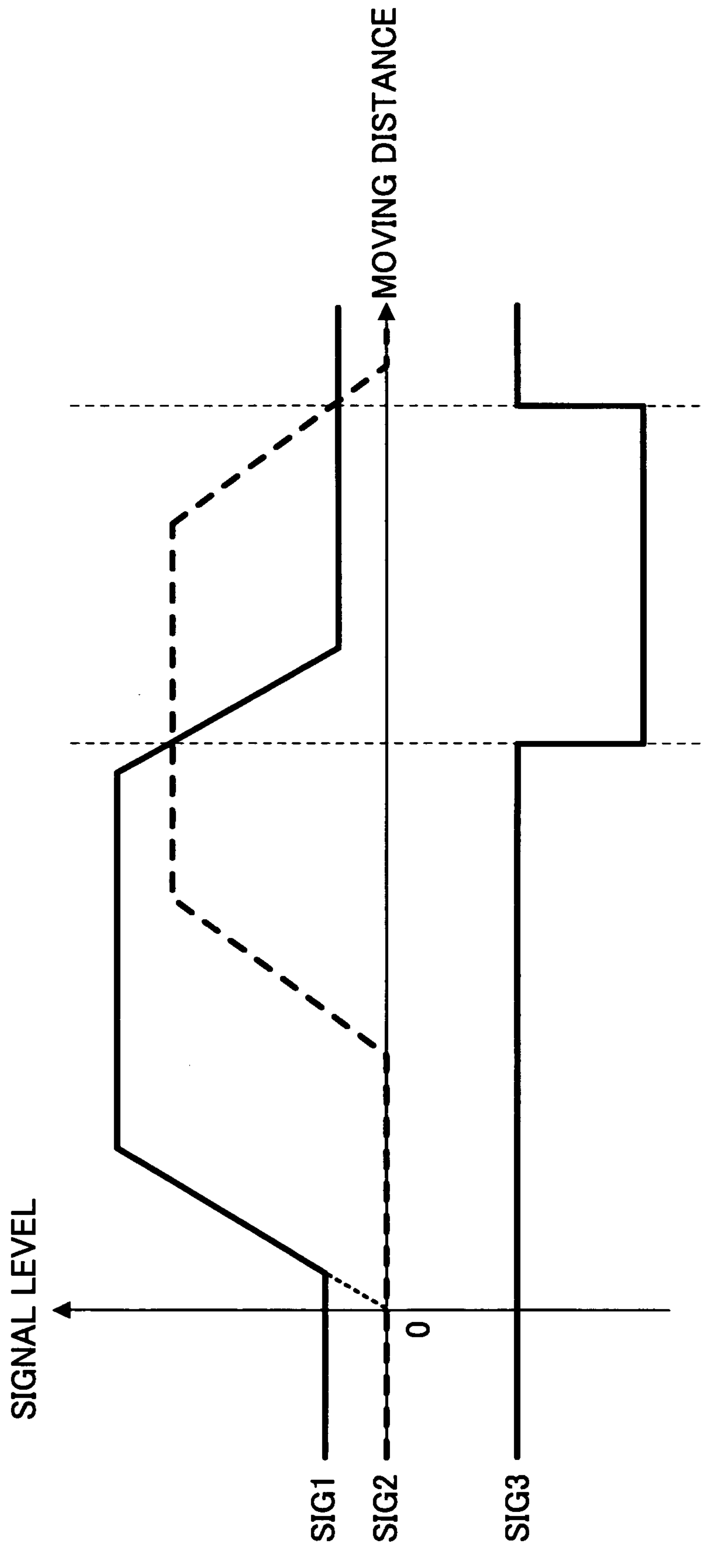
FIG. 6 is a timing chart of signals according to an embodiment of the present invention.

FIG. 6 is a timing chart of signals according to one embodiment of the present invention. As shown in FIG. 6, since the peak level of the toner detection image signal SIG2 is lower than the peak level of the toner image detection signal SIG1, the image detection output signal SIG3 is determined even if a toner image having a size greater than a predetermined size (Dt>(1+A)Dp+Dg) is detected and the peaks of the toner image detection signals SIG1 and SIG2 overlap each other in time.

The ratio A of the operational amplifier Z12 to the operational amplifier Z11 (V2=A×V1, A<1)) is determined to meet the following conditions (1)-(3):

(1) The output of the operational amplifier Z11 does not exceed the maximum output voltage (Vomax). The condition (1) is represented by the following mathematical expression: V1max≦Vomax, where V1max is the maximum output voltage of the toner image detection signal SIG1.

(2) The voltage at the cross point is greater than the clamping voltage Vc. The condition (2) is represented by the following expression:

$$\frac{A \times (Dt - Dg) \times V1\text{min}}{(1 + A) \times Dp \times V1\text{min}} \geqq Vc, \tag{7}$$

where V1min is the minimum output voltage of the toner image detection signal SIG1.

(3) Vc is in a range where the level difference between the toner image detection signals SIG1 and SIG2 is set such that noise is absorbed. The condition (3) is represented by the following expression: (1−A)×V1min≧Vc.

The conditions (1)-(3) are also represented by the single expression:

$$\frac{Vc \times Dp}{V1\text{min} \times Dt - V1\text{min} \times Dg - Vc \times Dp} \leqq A \leqq \frac{V1\text{min} - Vc}{V1\text{min}}, \tag{8}$$

where V1max≦Vomax.

However, when the toner image moves out of the detection area of the photodiode D1, the image detection output signal SIG3 is shifted to "L" and therefore might cause false detection of the toner image. In order to detect such a situation and make the image detection output signal SIG3 invalid, the pulse width of the image detection output signal SIG3 is referred to.

When the cross point voltage is V2 or less, i.e., Dt≦(1+A)Dp+Dg, then the pulse width of the image detection output signal SIG3 is represented by the following expression:

$$Pw = \frac{1}{Vt}\left\{\left[1 - \frac{Vc}{V2}\right] \times Dp + \left[\frac{V1}{V1 + V2}\right] \times Dg + \left[\frac{V2}{V1 + V2}\right] \times Dt\right\}, \tag{9}$$

where Vc is the clamping voltage, and vt is the moving speed of the intermediate transfer member 14 as an image carrier.

As can be understood from the above Expression (9), Pw increases in proportion to Dt, and the pulse width becomes maximum when the cross point voltage is V2, i.e., Dt=(1+A)Dp+Dg. The maximum pulse width is represented by the following expression:

$$Pw(\max) = \frac{1}{Vt}\left\{\left[1 - \frac{Vc}{V2} + \frac{V2}{V1}\right] \times Dp + Dg - \alpha\right\}, \tag{1}$$

where α is tolerance.

This value of the maximum pulse width does not change as long as Dt>(1+A)Dp+Dg. Accordingly, by making the output of the image detection output signal SIG3 invalid when the pulse has the width represented by Expression (1), malfunction of the image position detecting device 28 is prevented.

For example, Pw(max) is calculated given that the design value of Dt is Dt≈Dp and V1 and V2 in Expression (9) have certain values. When the image detection output signal SIG3 is equal to the calculated Pw(max) or greater, the image detection output signal SIG3 is considered erroneous (is made invalid). The pulse width Pw(max) may vary within a small range owing to the tolerance α.

According to the above-described embodiment, the position of the image on the image carrier can be accurately detected.

Figure 7:
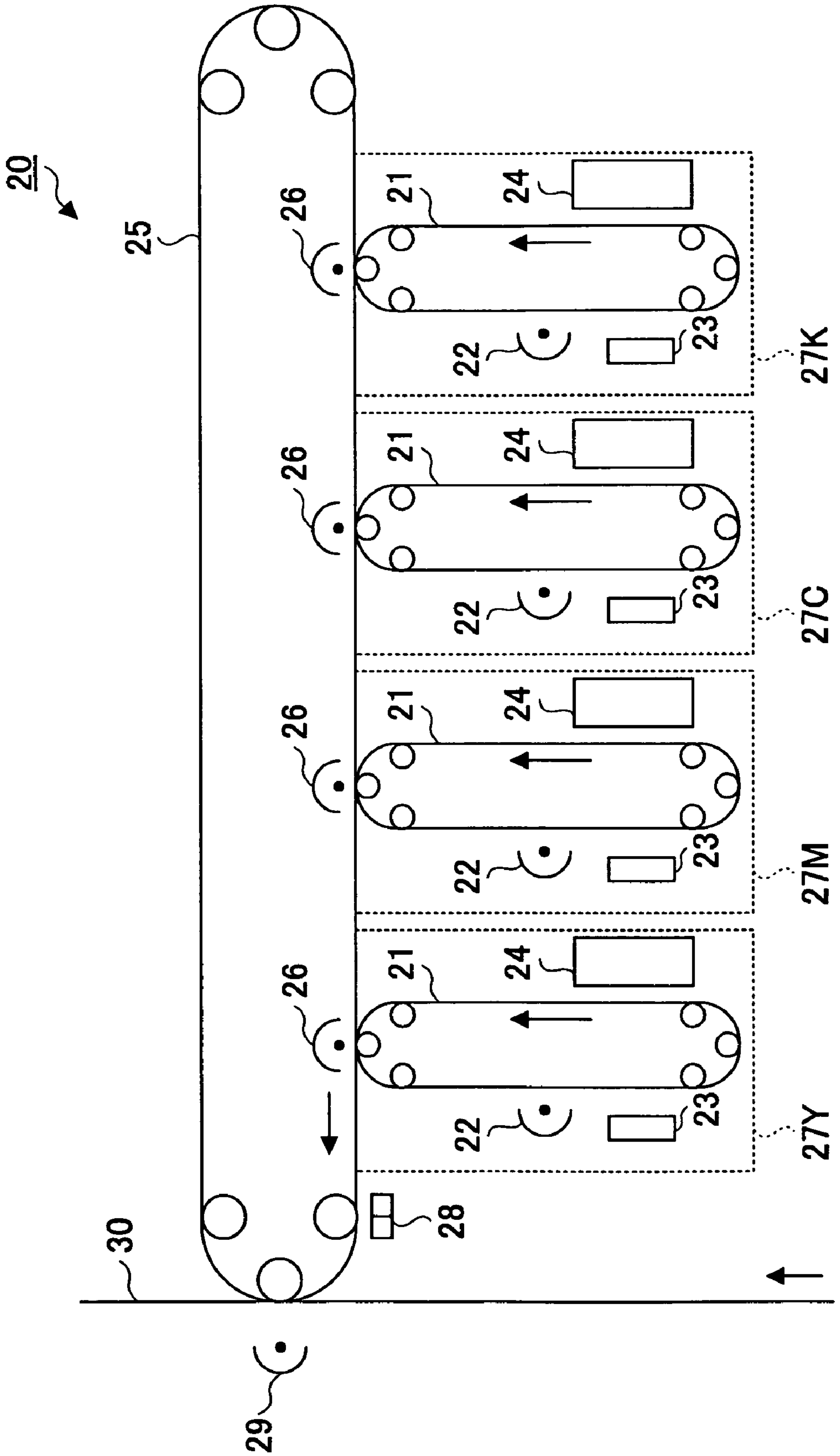
FIG. 7 illustrates the general configuration of an image forming apparatus comprising an image position detecting device according to an embodiment of the present invention.

The following describes an image forming apparatus 20 comprising the above-described image position detecting device 28 with reference to FIG. 7. FIG. 7 illustrates the general configuration of the image forming apparatus 20 comprising the image position detecting device 28 according to one embodiment of the present invention. Although FIG. 7 shows the configuration of an electrophotographic color printer as an example of the image forming apparatus 20, the configuration of the image forming apparatus 20 is not limited to the configuration shown in FIG. 7.

The image forming apparatus 20 comprises an intermediate transfer member 25 as an image carrier, first transfer devices 26, a black image forming device 27K, a cyan image forming device 27C, a magenta image forming device 27M, a yellow image forming device 27Y, and a second transfer device 29.

Each of the image forming devices 27K, 27C, 27M, and 27Y includes a photosensitive belt 21, a corona charger 22, an LED head 23 as a light emitter, and a development device 24.

With reference to FIG. 7, in each of the image forming devices 27K, 27C, 27M, and 27Y, the photosensitive belt 21 continuously rotates at a speed corresponding to the printing speed of the image forming apparatus 20 from when a printing operation starts until the printing operation is completed. When the photosensitive belt 21 starts rotating, high voltage is applied to the corona charger 22. Thus, the surface of the photosensitive belt 21 is uniformly charged by the corona charger 22, for example, negatively.

When the image forming apparatus 20 generates image data, such as character data and graphic data converted into dot images, On/Off signals for each LED head 23 are acquired from, e.g., a control unit of a controller (not shown) or the like. Thus, the LED head 23 is turned on/off so as to irradiate LED light onto a desired part of the surface of the photosensitive belt 21. As a result, an electrostatic latent image is formed on the photosensitive belt 21.

When the electrostatic latent image formed on the photosensitive belt 21 faces the development device 24, negatively charged toner is added to the photosensitive belt 21, for example. The negatively charged toner is electrostatically attracted to the part of the photosensitive belt 21 where the charges are removed due to irradiation of the LED light from the LED head 23, so that a toner image is formed thereon.

The toner image formed on the photosensitive belt 21 is transferred onto the intermediate transfer member 25 by the corresponding first transfer device 26, which is disposed at the backside of the intermediate transfer member 25 to add electric charges having opposite polarity to the toner image (e.g., positive electric charges).

In the image forming apparatus 20 for color printing shown in FIG. 7, toner images with different colors are thus formed on the corresponding photosensitive belts 21 in the black image forming device 27K, the cyan image forming device 27C, the magenta image forming device 27M, and the yellow image forming device 27Y, and sequentially transferred to the intermediate transfer member 25, so that a superposed toner image is formed on the intermediate transfer member 25. Similar to the photosensitive belts 21 of the image forming devices 27K, 27C, 27M, and 27Y, the intermediate transfer member 25 continuously rotates at a speed corresponding to the printing speed of the image forming apparatus 20 from when a printing operation starts until the printing operation is completed. The toner image formed on the intermediate transfer member 25 is transferred onto a recording medium 30, such as paper, by the second transfer device 29. The toner image transferred on the recording medium 30 is fixed by heat and pressure. Thus, a series of printing steps is completed.

As mentioned earlier, a problem with image forming apparatus that form a color toner image by combining toner images with different colors is that color shift might occur due to misalignment between the toner images with different colors (registration error).

The image forming apparatus 20 of this embodiment detects, with use of the image position detecting device 28, the toner images with different colors formed by the respective image forming devices 27K, 27C, 27M, and 27Y, and detects misalignment between the toner images with different colors by calculating the time difference and the like. The image forming apparatus 20 then adjusts the light emission timing of the LED heads 23, the rotational speed of the photosensitive belts 21, and the moving speed of the intermediate transfer member 25 based on the detection result obtained from the image position detecting device 28 so as to eliminate the color shift. The image forming apparatus 20 thus can form images accurately.

According to the above-described embodiments of the present invention, the position of the image on the image carrier can be accurately detected. More specifically, by giving a level difference between the first analog signal and the second analog signal, the first and second analog signals can be prevented from being at the same level even when only the image carrier or only the toner image is detected.

Moreover, the influence of the condition of the image carrier can be reduced by applying different amplification factors to give the level difference. False detection of the signal due to noise can be prevented by setting the level difference such that noise is absorbed. False detection can be prevented by making the image detection output signal SIG3 invalid when the pulse width of the image detection output signal SIG3 is greater than a predetermined value. Moreover, highly accurate images can be formed by performing detection and correction of color shift.

While the present invention has been described in terms of preferred embodiments, it will be apparent to those skilled in the art that variations and modifications may be made without departing from the scope of the invention as set forth in the accompanying claims.

The present application is based on Japanese Priority Application No. 2005-051682 filed on Feb. 25, 2005, with the Japanese Patent Office, the entire contents of which are hereby incorporated by reference.

What is claimed is:

1. An image position detecting device that detects a position of an image based on a reflected light from an image carrier that reflects a light irradiated from a light emitting source, comprising:

first and second light receivers that are spaced apart by a predetermined distance in a moving direction of the image carrier such that the first light receiver detects a toner image adhered on and being moved by the image carrier first, and the second light receiver detects the toner image later;

a first amplifier that receives a first analog signal from the first light receiver and amplifies the first analog signal;

a second amplifier that receives a second analog signal from the second light receiver and amplifies the second analog signal;

wherein the first and second amplifiers have different amplification factors that produce respective first and second amplified analog signals having different peak levels that overlap in time; and a comparison output unit configured to compare the first and second amplified analog signals having the different peak levels that overlap in time to determine whether a level of the first amplified analog signal is higher than a level of the second amplified analog signal, and outputs the comparison result as an output signal in binary form.

2. The image position detecting device as claimed in claim 1, wherein the level difference between a peak level of the first analog signal and a peak level of the second analog signal is set such that a noise is absorbed.

3. The image position detecting device as claimed in claim 1, wherein comparison output unit makes the output signal invalid when a pulse width of the output signal is greater than a predetermined value.

4. The image position detecting device as claimed in claim 3, wherein the pulse width Pw is represented by the following expression:

$$Pw(\max) = \frac{1}{Vt}\left\{\left[1 - \frac{Vc}{V2} + \frac{V2}{V1}\right] \times Dp + Dg - \alpha\right\}, \quad (1)$$

where Dp is a size of each of the first light receiver and the second light receiver in the moving direction of the image carrier, Dg is a distance between first light receiver and the second light receiver in the moving direction of the image carrier, V1 is the peak level of the first analog signal, V2 is the peak level of the second analog signal, Vc is a clamping voltage that defines the minimum level of the second analog signal, and Vt is a moving speed of the image carrier.

5. An image forming apparatus, comprising:

the image position detecting device of claim 1.

6. An image position detecting device that detects a position of an image based on a reflected light from an image carrier that reflects a light irradiated from a light emitting source, comprising:

first and second light receivers that are spaced apart by a predetermined distance in a moving direction of the image carrier such that the first light receiver detects a toner image adhered on and being moved by the image carrier first, and the second light receiver detects the toner image later; and a comparison output unit that compares a first analog signal input from the first light receiver and a second analog signal input from the second light receiver to determine whether a level of the first analog signal is higher than a level of the second analog signal, and outputs the comparison result as an output signal in binary form;

wherein the first and second analog signals are input to the comparison output unit at different peak levels when the peak levels of the first and second analog signals overlap in time;

wherein comparison output unit makes the output signal invalid when a pulse width of the output signal is greater than a predetermined value; and wherein the pulse width Pw is represented by the following expression:

$$Pw(\max) = \frac{1}{Vt}\left\{\left[1 - \frac{Vc}{V2} + \frac{V2}{V1}\right] \times Dp + Dg - \alpha\right\}, \quad (1)$$

where Dp is a size of each of the first light receiver and the second light receiver in the moving direction of the image carrier, Dg is a distance between the first light receiver and the second light receiver in the moving direction of the image carrier, V1 is the peak level of the first analog signal, V2 is the peak level of the second analog signal, Vc is a clamping voltage that defines the minimum level of the second analog signal, and Vt is a moving speed of the image carrier.

* * * * *